UNITED STATES PATENT OFFICE.

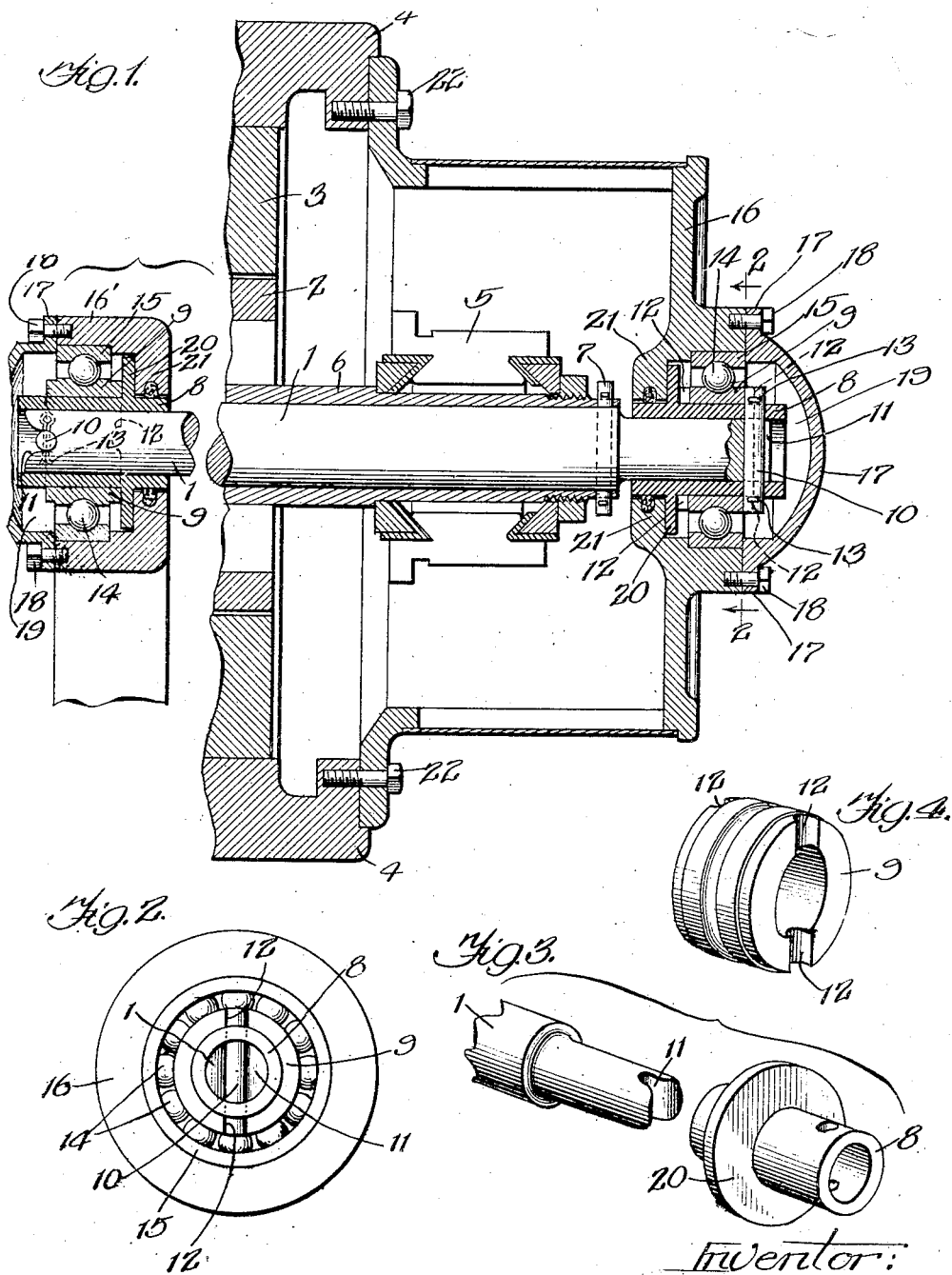

MARK A. ROSS, OF CHICAGO, ILLINOIS.

SHAFT STRUCTURE.

1,251,108.   Specification of Letters Patent.   Patented Dec. 25, 1917.

Application filed June 16, 1916.   Serial No. 103,957.

*To all whom it may concern:*

Be it known that I, MARK A. Ross, citizen of the United States, residing at Chicago, in the county of Cook and State of Illinois, have invented a certain new and useful Improvement in Shaft Structures, of which the following is a full, clear, concise, and exact description, reference being had to the accompanying drawings, forming a part of this specification.

My invention relates to shafts and rotating and non-rotating elements and is of particular service where shafts rotate within bearings that are supported by stationary bearing carriers, though the invention is not to be thus limited. The invention has for its object the provision of an improved assembly of the shaft and the bearing element or elements whereby the parts may be quickly assembled, disassembled and reassembled.

In the preferred embodiment of the invention a roller bearing structure is employed whose inner raceway is adapted to be coupled with the shaft so as to rotate therewith by means of my invention whereby such raceway may readily be slipped into and out of place. The outer raceway is desirably slidably secured in the carrier therefor and may be removed and replaced together with the first raceway. There is also desirably employed a sleeve which intervenes between the shaft and the inner raceway and which takes part in assembling such raceway with the shaft.

I will explain my invention more fully by reference to the accompanying drawing showing the preferred embodiment thereof and in which Figure 1 is a view of the shaft of a dynamo-electric machine having bearings associated therewith in accordance with my invention; Fig. 2 is a view on line 2—2 of Fig. 1; Fig. 3 is a view of component parts in separated relation; and Fig. 4 is a perspective view illustrating the formation of the end faces of the inner raceway, such formation being similar upon both end faces so that the bearing may be slipped upon the shaft with either end face outermost.

Like parts are indicated by similar characters of reference throughout the different figures.

In the embodiment of the invention illustrated the shaft 1 rotates and carries an armature 2 of a dynamo-electric machine whose field portion 3 is carried by the casing 4. This armature shaft carries the usual commutator 5 and an assembling quill shaft 6 desirably intervening between the shaft 1 and the armature and commutator and held in assembly with the shaft 1 by a key 7. The preferred form of bearing of my invention is illustrated at each end of the shaft. Each bearing has a mounting sleeve 8 that is adapted to be slid off and on the associate reduced end of the shaft and, in turn, the inner raceway 9 of each roller bearing is adapted to be slid off and on the sleeve 8 pertaining thereto. The shaft 1, each sleeve 8, and the corresponding inner raceway 9 are assembled to prevent either of these elements from turning with respect to the others by means of a key 10 which is desirably in the form of a pin that is received within or engaged by a groove 11 or other suitable formation in the adjacent end face of the shaft and which pin passes through diametrically alined openings in the sleeve 8 that are alined with said groove and the ends of which pin are received in a pair of diametrically alined grooves 12 in the outer faces of the inner raceway. Pins 13 may be employed to keep the pin 10 from slipping. Balls or other rollers 14 turn upon the inner raceway and support the outer raceway 15 which is supported by a carrier 16 or 16¹, carrier 16 being an end wall of the casing pertaining to the dynamo-electric machine and which casing is suitably mounted in any desired manner. The outer raceway 15 is preferably slidably received in its carrier 16 or 16¹, whereby the entire roller bearing may be separated from the balance of the structure. A cap 17 is held upon each carrier 16, 16¹ by means of cap screws 18. This cap incloses a space 19 into which the shaft 1 and sleeve 8 project and in which the pin 10 is disposed, this space being preferably filled with lubricating grease for lubricating the adjacent roller bearing. Each sleeve 8 is provided with a flange 20 that projects into a continuation of the space that receives the associate raceways and which serves to obstruct the passage of lubricating grease from the roller bearing into the interior of the dynamo-electric machine. Each carrier has an inward extension 21 that engages the inner face of the corresponding flange 20 and closely approaches but does not come quite in contact with the portion of the associate sleeve 8 that is inwardly extended beyond its flange 20. The engagement of the elements 20 and 21 serves further to prevent the seepage of lubricant into the interior of the dynamo-electric machine. That portion of the casing of the machine which surrounds the commutator is secured to the balance of the casing by means of cap screws 22. Whenever it is desired to gain access to the bearing structure at either end, the corresponding cap 17 is removed by unscrewing its screws 18. If the bearing structure is to be disassembled the corresponding pins 13 are taken out and the associate pin or key 10 is slipped endwise out of the holes in the projecting outer end of the sleeve 8 whereby the groove 11 is freed of the presence of this key or pin 10. The shaft 1 and each pin 10 are also separable by relative movement of the latter longitudinally of the former which may occur by moving the sleeve 8 outwardly without removing the key 10. After key 10 is removed from sleeve 8 the roller bearing structure may be slipped off the sleeve 8 and the sleeve 8 itself may also be slipped off the shaft 1. When a key 10 remains in engagement with its sleeve 8 the sleeve and roller bearing structure may be removed from the shaft as a unit, an operation that does not require the removal of the corresponding cap 17 and which may occur, for example, when the portion of the casing surrounding the commutator is removed to gain access to the commutator end of the machine. The flange 20 (interposed between the frame extension 21 and the ball bearing structure that is carried by the end wall 16) causes the removal of the sleeve 8 when the carrier 16 is removed for if it were not for the presence of this flange or some other means for coupling or interengaging the sleeve 8 with the end wall 16 and the roller bearing structure, the sleeve 8 might remain upon the shaft upon the removal of the end wall 16 and the roller bearing structure. The flange 20 and the key 10 also coöperate to fixedly locate the roller bearing structure upon the corresponding sleeve 8. I do not, however, limit myself to the use of the flange.

Claims relating more particularly to the arrangement of the roller bearing and keying device form the subject matter of my division of this application Serial No. 124,286, filed October 7, 1916.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:

1. The combination with a shaft; of a sleeve slidable on an end of the shaft; a bearing slidable on the sleeve; and a key engaging the shaft, sleeve and bearing to prevent rotation of these elements with respect to each other, said shaft having a key engaging formation permitting movement of the key longitudinally of the shaft toward and away from the shaft.

2. The combination with a shaft; of a bearing element slidable on an end of the shaft; and a key engaging the shaft and said bearing element to prevent rotation of these elements with respect to each other, said shaft having a key engaging formation permitting movement of the key longitudinally of the shaft toward and away from the shaft.

3. The combination with a shaft; of a sleeve slidable on an end of the shaft; and a key engaging the shaft and said sleeve to prevent rotation of these elements with respect to each other, said shaft having a key engaging formation permitting movement of the key longitudinally of the shaft toward and away from the shaft.

In witness whereof, I hereunto subscribe my name this 9th day of June, A. D. 1916.

MARK A. ROSS.

Witnesses:
G. L. CRAGG,
E. L. WHITE.